United States Patent
Giove et al.

(10) Patent No.: US 9,835,267 B2
(45) Date of Patent: Dec. 5, 2017

(54) VALVE PACKING FUGITIVE EMISSION DETECTION SYSTEM

(75) Inventors: Fabio Giove, Gioia del Colle (IT); Jalil Abrahimzadeh, Mission Viejo, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 523 days.

(21) Appl. No.: 13/605,821

(22) Filed: Sep. 6, 2012

(65) Prior Publication Data

US 2013/0061954 A1 Mar. 14, 2013

Related U.S. Application Data

(60) Provisional application No. 61/532,937, filed on Sep. 9, 2011.

(51) Int. Cl.
| | | |
|---|---|---|
| F16K 31/02 | (2006.01) |
| F16K 41/04 | (2006.01) |
| F16J 15/00 | (2006.01) |
| F16J 15/18 | (2006.01) |
| F16J 15/3296 | (2016.01) |
| F16K 37/00 | (2006.01) |

(52) U.S. Cl.
CPC ............. *F16K 41/04* (2013.01); *F16J 15/004* (2013.01); *F16J 15/183* (2013.01);
(Continued)

(58) Field of Classification Search
CPC .. F16K 41/04; F16K 37/0083; F16K 37/0091; G01M 3/2876; G01M 3/224;
(Continued)

(56) References Cited

U.S. PATENT DOCUMENTS

| | | |
|---|---|---|
| 2,210,826 A | 8/1940 | Williams |
| 3,907,307 A | 9/1975 | Maurer et al. |

(Continued)

FOREIGN PATENT DOCUMENTS

EP 1217352 A1 6/2002

OTHER PUBLICATIONS

PCT International Search Report and Written Opinion. PCT/US2012/054238, dated Nov. 16, 2012.
(Continued)

*Primary Examiner* — Paul West
*Assistant Examiner* — Xin Zhong
(74) *Attorney, Agent, or Firm* — Stetina Brunda Garred & Brucker

(57) ABSTRACT

In accordance with the resent invention, there is provided a fugitive emission detection system for use in conjunction with a valve having a packing deign which includes a primary packing and a secondary packing. The valve further includes a leak port which is disposed within the valve bonnet between the primary and secondary packings. The detection system is operative to maintain the leak port in a normally open state. As a result, any fluid leakage past the primary packing is normally sent to the detection system, as opposed to being applied to and thus pressurizing the secondary packing. In the event of that a prescribed level of fluid leakage beyond the primary packing is detected, the leak port will be closed. The closure of the leak port facilitates the pressurization of the secondary packing.

17 Claims, 4 Drawing Sheets

(51) Int. Cl.
*G01M 3/22* (2006.01)
*G01M 3/28* (2006.01)

(52) U.S. Cl.
CPC ....... *F16J 15/3296* (2013.01); *F16K 37/0083* (2013.01); *F16K 37/0091* (2013.01); *G01M 3/224* (2013.01); *G01M 3/2876* (2013.01); *Y10T 137/7761* (2015.04)

(58) Field of Classification Search
CPC ...... F16J 15/3296; F16J 15/183; F16J 15/004; Y10T 137/7761
USPC ........................ 73/46, 47, 40; 137/15.11, 312
See application file for complete search history.

(56) References Cited

U.S. PATENT DOCUMENTS

| | | | | |
|---|---|---|---|---|
| 4,972,867 | A * | 11/1990 | Ruesch | 137/15.11 |
| 5,056,757 | A * | 10/1991 | Wood | F16J 15/183 251/214 |
| 5,244,183 | A * | 9/1993 | Calvin et al. | 251/214 |
| 5,263,682 | A * | 11/1993 | Covert et al. | 251/214 |
| 5,345,812 | A * | 9/1994 | Haboian | G01M 3/2876 137/312 |
| 5,732,731 | A * | 3/1998 | Wafer | 137/312 |
| 6,763,703 | B2 * | 7/2004 | Krieger et al. | 73/49.8 |
| 7,048,254 | B2 * | 5/2006 | Laurent et al. | 251/214 |
| 2004/0256589 | A1 | 12/2004 | Laurent et al. | |
| 2008/0296405 | A1 * | 12/2008 | Hanson et al. | 239/225.1 |
| 2009/0222220 | A1 * | 9/2009 | Wilke | 702/34 |

OTHER PUBLICATIONS

Supplementary European Search Report for EP 12 830 842.6, dated Jan. 11, 2016.

European Examination Report for EP 12 830 842.6, dated Aug. 2, 2016.

European Office Action for EP 12 830 842.6, dated Nov. 25, 2016.

* cited by examiner

VALVE PACKING FUGITIVE EMISSION DETECTION SYSTEM

CROSS-REFERENCE TO RELATED APPLICATIONS

The present application claims priority to U.S. Patent Application Ser. No. 61/532,937 entitled Valve Packing Fugitive Emission Detection System filed Sep. 9, 2011.

STATEMENT RE: FEDERALLY SPONSORED RESEARCH/DEVELOPMENT

Not Applicable

BACKGROUND OF THE INVENTION

1. Field of the Invention

The present invention relates generally to valves and, more particularly, to a fugitive emission leak detection system for the valve packing of a valve, including valves which use live loaded packing assemblies or systems.

2. Description of the Related Art

In a typical valve construction, a valve stem may undergo a turning or sliding movement, or a combination of both movements, within its sleeve during the process of the valve moving between its open and closed configurations. In this regard, the sealing of the stem must be adequate to contend with such movement, while at the same time ensuring maintenance of fluid tightness against the pressure of the fluid flowing through the valve. A widely used type of stem sealing is a compression packing in which a gland or sleeve is used to apply a compressive force to a compression packing which surrounds a portion of the length of the stem. The resulting radial pressure of the packing onto the stem provides the desired seal so long as the radial pressure exceeds the pressure of fluid in the valve.

In certain valve configurations, compression may be applied to the packing through the use of packing bolts which are each attached at one end to a valve bonnet of the valve, and at their other end to a spigot, a flange or other projection bearing on, integral with or attached to the gland or sleeve which bears onto the packing. In this particular arrangement, the tightening of the bolts increases the pressure on the packing, thus facilitating the application of radial pressure onto the stem.

In other valve configurations, it is known to attach a spring between the nut used to tighten the bolt and a surface of the spigot or flange. Although coil springs may be used, a conventional practice is to use Belleville springs which are essentially formed as a series of dished washers. Such springs have a higher compression rating than a simple coil spring, with the use of the Belleville springs providing a "live-loaded" packing which can automatically compensate for changes that may take place in the packing under operating conditions of the valve, such as high pressures and temperatures. Since the volume of the packing material may reduce under certain operating conditions, or the temperature increase of the bolts and their further elongation may result in a load loss, the spring pressure compensates for such reduction and maintains the required pressure, thus avoiding potential harmful effects to the sealing of the stem in an unsprung valve which could result from the reduction in the packing material volume. Alternatively, if the volume of the packing material increases (which can happen with certain packing materials), the radial pressure of the stem in an unsprung valve could increase too much, thus possibly causing sticking of the stem. The spring value, however, can accommodate the pressure increase by means of further compression of the springs.

In certain valve designs, including those which include a live-loaded packing as described above, the packing is segregated into a primary packing and a secondary packing. In these designs, only the primary packing should normally being pressurized by the fluid in the valve, the secondary packing working with a zero pressure drop on it. In a number of existing valves including both a primary and secondary packing, an inter-stage port or leak port extends through the valve bonnet of the valve into fluid communication with a passageway which extends through the valve bonnet and accommodates the valve stem. However, in current valve designs, this leak port is normally closed, and is only periodically opened manually to monitor the status of the primary packing. A major drawback of the leak port being normally closed is that any leak from the from the primary packing will pressurize the secondary packing, which typically results in both the primary and secondary packings becoming worn and compromising their operation, thus further destroying the efficacy of the secondary packing as a back-up to leakage through the primary packing.

Recently, there has been an increasing level of demand in many oil and gas applications for the low level emission of Volatile Organic Compounds (VOC's). In this regard, various laws enacted in Europe and other jurisdictions currently define the maximum concentration level of pollutants that can be detected in the air in an industrial setting, and proximate valves located therein. These laws and regulations are having the effect of forcing valve manufactures to adopt new designs for valve packing and sealing systems to comply with the same. These packing and sealing systems are tested during the design phase of the valve, and are again tested during the production phase thereof.

A current practice in oil and gas industrial settings is to use analyzers to monitor for potential leaks from valves and other fluid conduits which would giving rise to undesirable pollutant concentrations in the surrounding air. These analyzers are adapted to provide an alarm to the plant operators, but do not effectively provide a way to verify that the cause of such alarm is actually attributable to the leakage of a valve as opposed to the pollutant concentrations emanating from another source. These analyzers further do not provide any modality to immediately reduce the emission level of the pollutant into the atmosphere in the event such pollutant is actually emanating from a valve. As a result, in current practices involving the handling of hazardous fluids, the generation of an alarm by the analyzer will sometimes result in a complete shut-down of the plant, with the lack of any emission reducing capability also creating the potential for injury to plant workers present in the area of a valve leak. The present invention addresses this problem by providing a fugitive emission detection system which is particularly suited for use in conjunction with valves including primary and secondary packings, as is operative to continuously monitor the emissions from the valve into the atmosphere and to actively cut or reduce such emissions by effectively switching the operation of the valve sealing system from the primary packing to the secondary packing. These, as well as other features and attributes of the present invention will be discussed in more detail below.

BRIEF SUMMARY OF THE INVENTION

In accordance with the present invention, there is provided a fugitive emission detection system for use in conjunction with a valve having a packing design which includes a primary packing and a secondary packing. The valve with which the detection system of the present invention is used further preferably includes an inter-stage port or leak port which is disposed within the valve bonnet between the primary and secondary packings. The detection system constructed in accordance with the present invention is operative to maintain the leak port in a normally open state. As a result, any fluid leakage past the primary packing is normally sent to the detection system, as opposed to being applied to and thus pressurizing the secondary packing.

More particularly, any fluid leakage past the primary packing of the valve is discharged from the leak port to the detection system of the present invention. After exiting the leak port of the valve, the leaking fluid may be directed into a ppm (or acc/sec) sensing system, such as a hazardous medium concentration detector or sniffing system with a mass spectrometer. As an alternative, the leaking fluid may be directed into a thermal micro-leak sensor which is operative to measure the level of leakage flow through the primary packing in terms of mass versus time, or a ppm detector located in the vicinity of the valve.

Once the leak has been measured by the detection system of the present invention, the leak value is sent to a programmable logic unit such as a distributed control system (DCS) or a central processing unit (CPU) for comparison of the leak value to a set reference value. In one embodiment of the present invention, the logic unit can be a stand-alone unit which is able to compare the measured value to the set reference value, and thereafter close the leak port. This closure of the leak port is facilitated by a linear or rotating type on-off valve which is installed on it, and may be automatic or manual in operation. If the on-off valve is manual, the logic unit will generate an alarm with a request to manually close the on-off valve. The closure of the leak port facilitates the pressurization of the secondary packing, thereby maximizing if efficacy in relation to reducing the level of the leak, or eliminating it in its entirety.

In an alternative embodiment of the present invention, the logic unit can be integrated into a positioner unit. In this embodiment, the logic unit is able to receive information from the positioner about the number of cycles performed and/or total stroke of the valve stem of the valve in order to establish when to carry out leak tests based on parameters originally input into the logic/positioner unit by a programmer or operator. The combination logic/positioner unit is further operative to fix the position of the main valve in order to guaranty a stable reading of any leak. Moreover, the logic/positioner unit is able to compare values as in the prior embodiment, and to close the leak port by an on-off valve which is installed on it, and may be automatic or manual in operation. Again, if the on-off valve is manual, the logic/positioner unit will generate an alarm with a request to manually close the on-off valve.

The present invention is best understood in reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
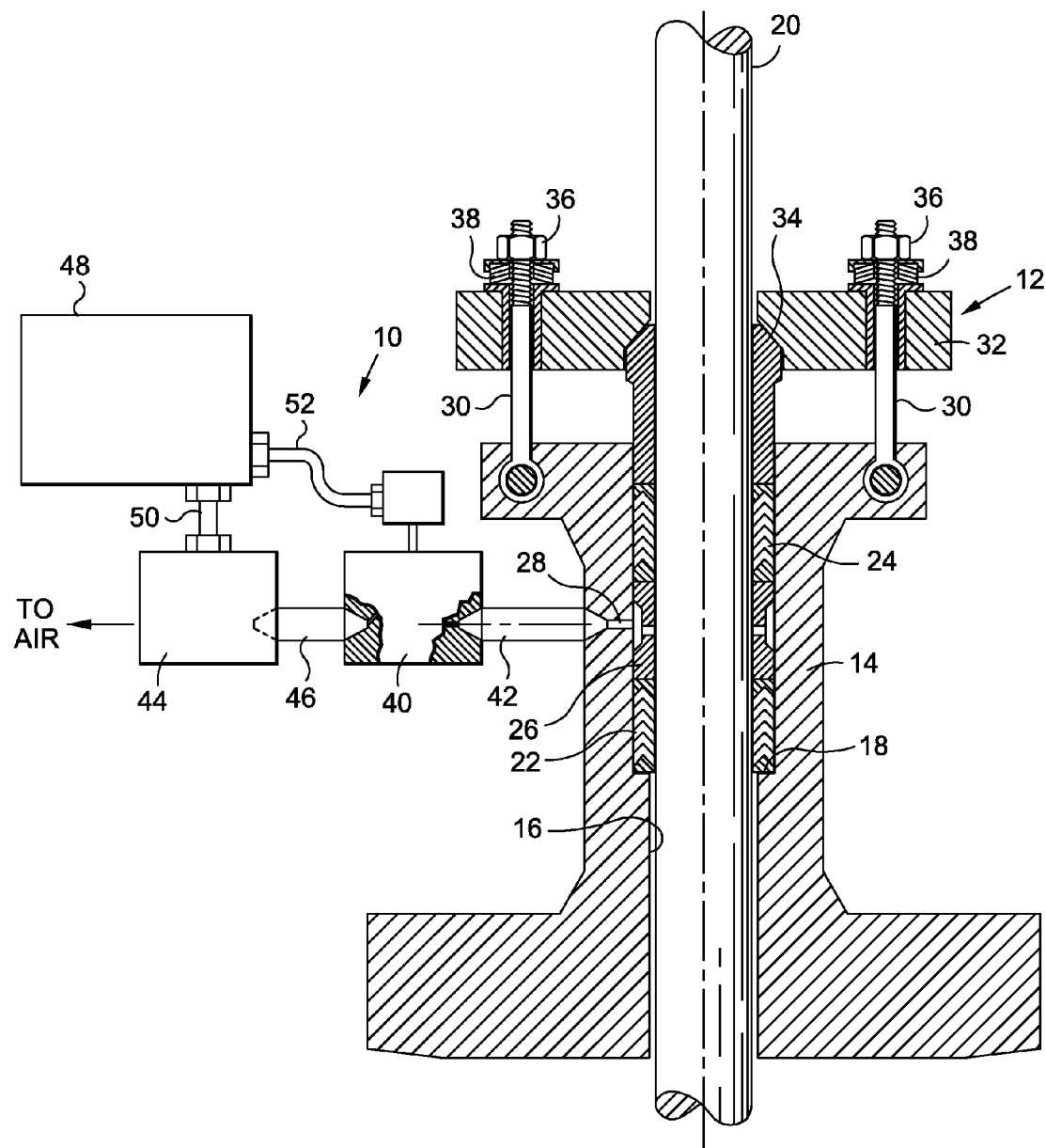
FIG. 1 is a schematic representation of a valve packing fugitive emission detection system constructed in accordance with a first embodiment the present invention, further depicting a partial cross-section of an exemplary valve including a packing system suited for use with the detection system.

Referring now to the drawings wherein the showings are for purposes of illustrating preferred embodiments of the present invention only, and not for purposes of limiting the same, FIG. 1 depicts a valve packing fugitive emission detection system 10 constructed in accordance with a first embodiment the present invention. In an exemplary application, detection system 10 is used in combination with a valve 12 which possesses certain structural features. More particularly, the valve 12 includes a body, which itself comprises a valve bonnet 14. Extending axially through the valve bonnet 14 is a central passageway 16. As seen in FIG. 1, the passageway 16 extending through the valve bonnet 14 is not of uniform inner diameter. Rather, when viewed from the perspective shown in FIG. 1, the passageway 16 is divided into an upper section which is of the first inner diameter, and a lower section which is of a second inner diameter less than that of the upper section. As a result, the upper and lower sections of the passageway 16 are separated from each other by an annular shoulder 18. Advanced through the passageway 16 is elongate valve stem 20 of the valve 12, the reciprocal movement of which opens and closes the valve 12 in a conventional manner.

The valve 12 further comprises a packing or sealing system which resides within the upper section of the passageway 16. The packing system surrounds and exerts radial pressure on that portion of the valve stem 20 which passes therethrough. When viewed from the perspective shown in FIG. 1, the packing system comprises a lower, primary packing 22 which rests upon the shoulder 18, an upper, secondary packing 24, and a lantern ring 26 which is disposed between and thus separates the primary and secondary packings 22, 24 from each other. As further seen in FIG. 1, the lantern ring 26 is not of a uniform outer diameter. Rather, the lantern ring 26 defines a central channel or recess which circumvents the outer surface thereof, thus resulting in a portion of the inner surface of the valve bonnet 14 which defines the upper section of the passageway 16 not being covered by the lantern ring 26.

As further seen in FIG. 1, extending to the uncovered segment of the inner surface of the valve bonnet 14 within the upper section of the passageway 16 is one end of an inter-stage port or leak port 28 of the valve 12. The leak port 28 extends in generally perpendicular relation to the axis of the passageway 16 (and hence the valve stem 20), and is operative to place the upper section of the passageway 16 into fluid communication with ambient air. Due to its alignment with the lantern ring 26, the leak port 28 effectively extends between the primary and secondary packings 22, 24. The use of the leak port 28 in the context of the detection system 10 of the present invention will be discussed in more detail below.

In the valve 12 with which the detection system 10 is preferably used, the packing system (including the primary and secondary packings 22, 24 and lantern ring 26) is preferably "live-loaded." In this regard, compression is preferably applied to the packing system through the use of a pair of elongate packing bolts 30 which are each attached at one end to the valve bonnet 14. The other end of each of the packing bolts 30 is attached to a load flange 32 of the valve 12. The load flange 32 is itself cooperatively engaged to (i.e., bears on) a packing follower or sleeve 34 of the valve 12. When viewed from the perspective shown in FIG. 1, the load flange 32 bears against the upper end portion of the packing sleeve 34, with the opposed, lower end portion of the packing sleeve 34 normally residing within the upper section of the passageway 16 and bearing against the secondary packing 24. As such, the secondary packing 24 is effectively captured between the packing sleeve 34 and the lantern ring 26, with the primary packing 22 effectively being captured between the lantern ring 26 and the shoulder 18 defined between the upper and lower sections of the passageway 16. The valve stem 20 extends axially through the packing sleeve 34, and further through a central opening of the load flange 32 which is coaxially aligned with the passageway 16.

In the valve 12, the tightening of the packing bolts 30, and in particular the nuts 36 threadably engaged thereto, increases the pressure on the packing system, thus facilitating the application of radial pressure onto the valve stem 20. To facilitate the live-loaded functionality of the valve 12, a series of springs such as Belleville springs 38 are captured between each of the nuts 36 and the corresponding exterior surface of the load flange 32. The springs 38 provide the live-loaded functionality which can automatically compensate for changes that may take place in the packing system under the operating conditions of the valve 12, such as high pressures and temperatures. In this regard, since the volume of the packing materials used for the primary and secondary packings 22, 24 may reduce under certain operating conditions, the spring pressure exerted by the springs 38 compensates for such reduction and maintains the required pressure, this helping to maintain the integrity of the seal to the valve stem 20 facilitated by the packing system. Alternatively, if the volume of the packing material for the primary and secondary packings 22, 24 increases, the resultant increase in the radial pressure exerted by the packing system on the valve stem 20 can be accommodated by the compression of the springs 38.

Having thus described the structural attributes of the valve 10, the structural and functional features of the detection system 10 used therewith will now be described with further reference to FIG. 1.

The detection system 10 of the first embodiment comprises a control or on-off valve 40 which is fluidly connected to the leak port 28 of the valve 12 by a fluid line 42. As will be described in more detail below, during the operation of the detection system 10, the leak port 28 is normally maintained in an open state, thus allowing for fluid flow from the passageway 16, through the leak port 28 and fluid line 42, and through the on-off valve 40 (which is also normally open) to another component of the detection system 10. As will also be discussed in more detail below, in certain modes of operation of the detection system 10, the leak port 28 will be closed by the actuation of the on-off valve 40 to a closed position as effectively blocks the leak port 28. Along these lines, it is contemplated that on-off valve 40 may be either automatic or manual in operation. If automatic, the closure of the on-off valve 40 in the detection system 10 will occur automatically upon the detection system 10 sensing a level of fluid leakage past the primary packing 22 of the valve 12 which exceeds a prescribed threshold. If, on the other hand, the on-off valve 40 is manual in operation, the detection system 10, when sensing a level of fluid leakage past the primary packing 22 beyond a prescribed threshold, will generate an alarm which compels a plant worker to manually close the on-off valve 40, thus effectively blocking the leak port 28. However, irrespective of whether the on-off valve 40 is manual or automatic in its operation, it is contemplated that an alarm will also be generated which will notify site personnel that the primary packing 18 is in failure mode and that the valve 12 is currently relying on secondary packing 24. Operators will also be warned about the need to maintain the valve 12 by replacing the primary and secondary packings 22, 24 as quickly as possible.

In addition to the on-off valve 40, the detection system 10 comprises a pollutant concentration sensor or leak detection unit 44 which is fluidly connected to the on-off valve 40 by a fluid line 46. As will be recognized, when the on-off valve 40 is in an open position, any fluid flowing from the passageway 16 into the on-off valve 40 via the leak port 28 and fluid line 42 is in turn channeled through the on-off valve 40 into the leak detection unit 44 via the fluid line 46. It is contemplated that the leak detection unit 44 may be a hazardous medium concentration detector or sniffing system with the mass spectrometer. The leak detection unit 44 may also be a thermal micro-leak sensor which is operative to measure the level of leakage flow through the primary packing 22 in terms of mass versus time.

The detection system 10 further comprises a programmable logic unit 48 such as a distributed controlled system (DCS) or a central processing unit (CPU). The logic unit 48 is placed into electrical communication with the leak detection unit 44 by a wiring connection 50 extending therebetween. The wiring connection 50 allows sensor readings generated by the leak detection unit 44 to be effectively transmitted to the logic unit 48. As will be discussed in more detail below, in the operation of the detection system 10, the logic unit 48 is operative to compare a leak value generated by the leak detection unit 44 to a set reference valve originally programmed into and stored within the logic unit 48. The logic unit 48 is further placed into electrical communication with the on-off valve 40 by a wiring connection 52 extending therebetween. The wiring connection 52 is operative to, among other things, facilitate the transmission of a valve control signal from the logic unit 48 to on-off valve 40.

Having thus described the structural features of the detection system 10, a preferred modality of operation thereof in conjunction with the valve 12 will now be discussed with further reference to FIG. 1.

During operation of the valve 12, any fluid leakage past the primary packing 22 will reach the lantern ring 26 and, due to the structural attributes thereof, will be directed into the leak port 28 within the valve bonnet 14. The leaking fluid will flow through the leak port 28 and into the fluid line 42 fluidly coupled thereto. From the fluid line 42, the leaking fluid will flow into and through the on-off valve 40 (which is normally open) and thereafter into the leak detection unit 44 via the fluid line 46.

Once the fluid leakage level has been measured by the leak detection unit 44, a leak value is transmitted by the leak detection unit 44 to the programmable logic unit 48 via the wiring connection 50 therebetween. The programmable logic unit 48 is operative to compare the leak value transmitted thereto to a set reference value previously programmed into and stored therein. These values may be read as a peak or an average along with the measuring time interval. If the measured value exceeds the set reference value, the programmable logic unit 48 is operative to transmit a control signal to the on-off valve 40 via the wiring connection 52 therebetween, such control signal being operative to actuate the on-off valve 40 from its normally open position to a closed position which effectively closes or blocks the leak port 28. As will be recognized, in this instance, the on-off valve 40 is automatic in that the actuation thereof from the open position to the closed position is facilitated by the signal transmitted thereto by the programmable logic unit 48. However, as previously explained, it is contemplated that the detection system 10 may be configured such that the on-off valve 40 is manual in operation, rather than being automatic. As will be recognized, in this particular variant of detection system 10 wherein the on-off valve 40 is manual, the wiring connection 52 extending from the programmable logic unit 48 is eliminated. In this regard, when the programmable logic unit 48 determines that the measured value of fluid leakage exceeds the set reference value, an alarm is generated thereby which is used to compel a plant operator to manually close the on-off valve 40 to effectuate the closure or blockage of the leak port 28.

In the detection system 10, the closure of the leak port 28 facilitated by the actuation (automatically or manually) of the on-off valve 40 from its open position to its closed position facilitates the pressurization of the secondary packing 24, thereby maximizing its efficacy in relation to reducing the level of the leakage from the valve 12, or eliminating such leakage in its entirety. Since, in the detection system 10, the leak port 28 is normally open, any fluid leakage of the primary packing 22 is normally sent to ambient air via the detection system 10 in the manner depicted in FIG. 1. However, prior to the fluid leakage being vented to atmosphere, it is measured by the leak detection unit 44 in the aforementioned manner. As explained above, it is only after the leak is measured and compared to a prescribed leak value that the on-off valve 40 is potentially actuated to its closed position, thus facilitating the pressurization of the secondary packing 24.

Since the leak port 28 is not normally closed in the detection system 10, any fluid leakage from the primary packing 22 will not normally pressurize the secondary packing 24, and thus will not facilitate the premature wear and potential failure thereof. Thus, a primary advantage of the detection system 10 of the present invention is that it is operative to effectively switch the sealing function of the valve 12 from the primary packing 22 to the secondary packing 24 in the case of a failure identified by the leak detection unit 44. Along these lines, the programmable logic unit 48 is operative to either facilitate the automatic switch in operation from the primary packing 22 to the secondary packing 24 or, alternatively, to transmit an alarm which compels the manual switch of such operation.

Figure 2:
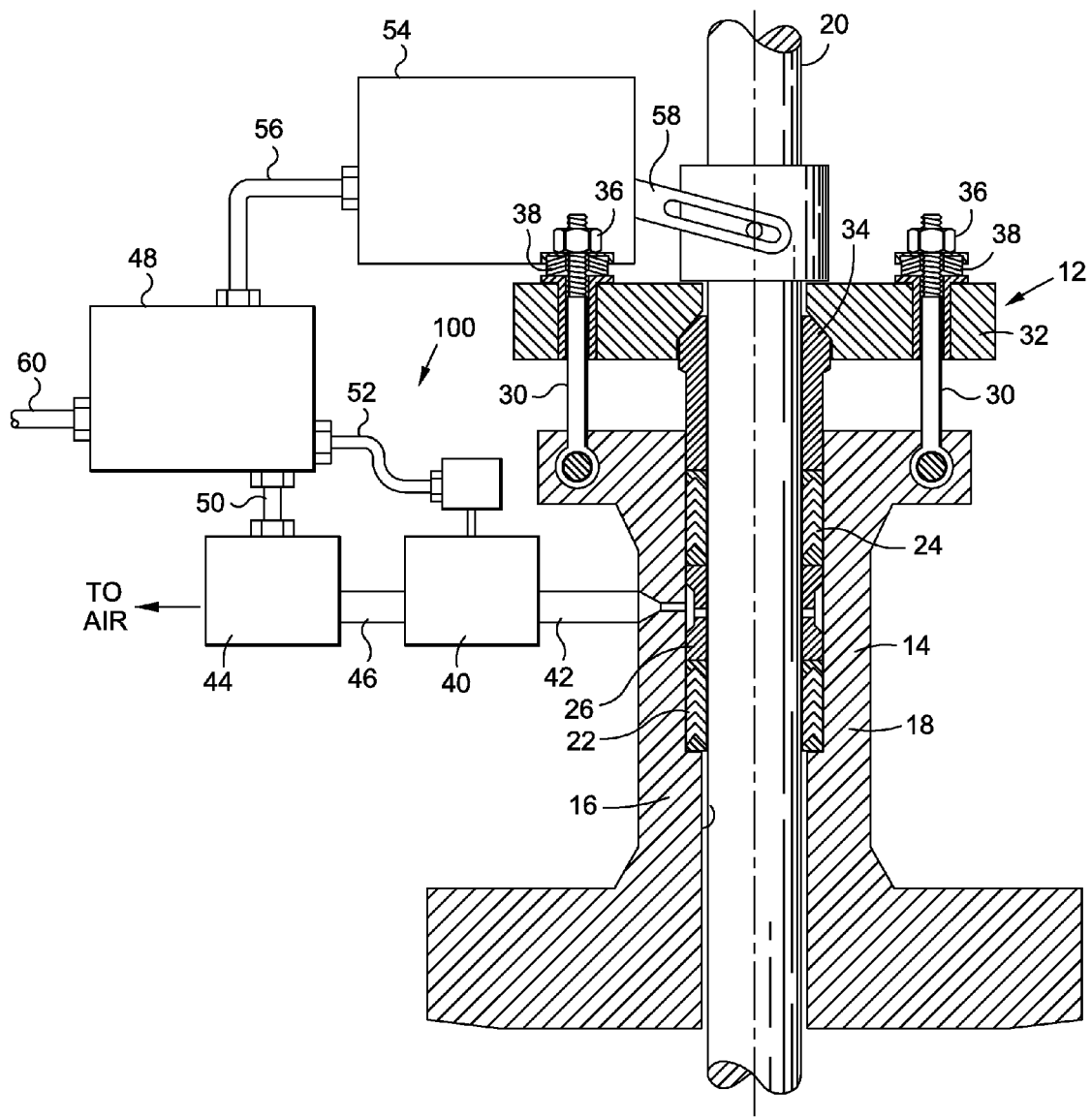
FIG. 2 is a schematic representation of a valve packing fugitive emission detection system constructed in accordance with a second embodiment the present invention, further depicting a partial cross-section of the exemplary valve and packing system shown in FIG. 1.

Referring now to FIG. 2, there is depicted a valve packing fugitive emission detection system 100 constructed in accordance with a second embodiment of the present invention. The detection system 100 is preferably used in combination with the above-described valve 12, and includes the same components identified and described above in relation to detection system 10. In this regard, the primary distinction between the detection system 100 and the detection system 10 lies in the addition of a smart positioner 54 to the detection system 100.

The positioner 54 of the detection system 100 is placed into electrical communication with the programmable logic unit 48 thereof via a wiring connection 56 which extends therebetween. The positioner 54 includes a feedback lever 58 which protrudes therefrom, and is mechanically coupled to the valve stem 20 of the valve 12. In the detection system 100, the positioner 54 is operative to monitor the number of cycles performed and/or total stroke of the valve stem 20, and/or the time in operation, and to transmit such information to the programmable logic unit 48 via the wiring connection 56. Using this information, the programmable logic unit 48 of the detection system 100 is able to determine when to carry out leak tests on the valve 12 based on parameters originally input therein by a programmer or operator. The communication between the positioner 54 and the programmable logic unit 48 is further operative to allow the position of the valve stem 20 to be fixed in a prescribed manner in order guaranty a stable reading of any fluid leakage past the primary packing 22 of the valve 12, or to allow the leakage reading to be compared to the movement of the valve stem 20. Also electrically coupled to the programmable logic unit 48 in the detection system 100 is a wiring connection 60 which is operative to selectively transmit a 4-20 mA valve control signal thereto. Though not shown in FIG. 2, it is contemplated that the programmable logic unit 48 can be integrated into the positioner 54.

In all other respects, the functionality of the detection system 100 is the same as that described above in relation to the detection system 10. In this regard, the programmable logic unit 48 is able to compare values as in the detection system 10, and to facilitate the actuation of the on-off valve 40 to its closed position, thus in turn closing or blocking the leak port 28. As explained above in relation to the detection system 10, the actuation of the on-off valve 40 from its normally open position to its closed position may be automatically triggered by a signal sent from the programmable logic unit 48 thereto via the wiring connection 52 or, alternatively, may be manually accomplished by a plant operator as a result of an alarm generated by the programmable logic unit 48.

Figure 3:
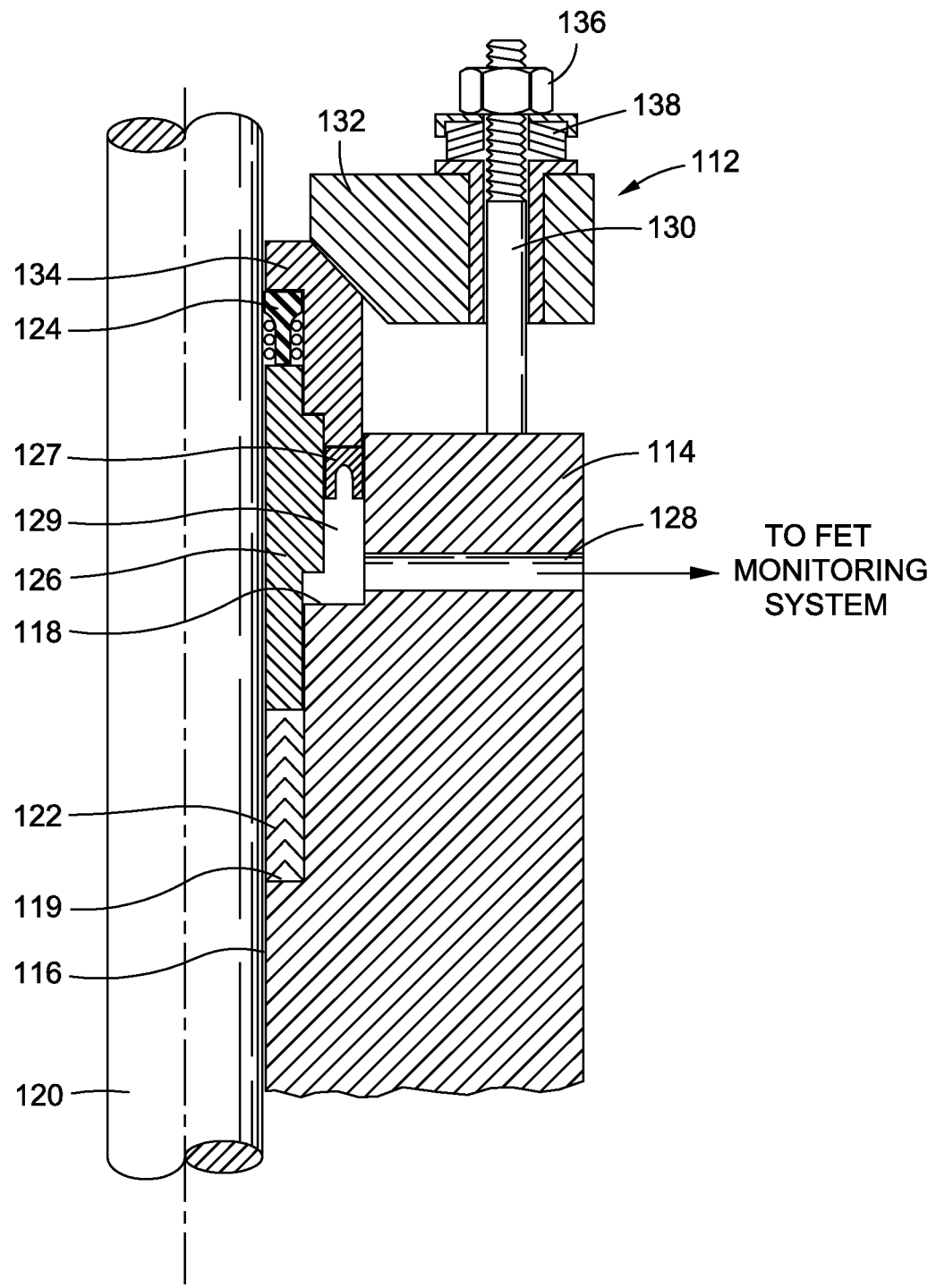
FIG. 3 is a partial cross-sectional view of a valve including a packing system which is suited for use with the valve packing fugitive emission detection systems shown in FIG. 1 or 2 and may be used as an alternative for the exemplary valve and packing system shown therein.

Referring now to FIG. 3, in accordance with the present invention, it is contemplated that either of the above-described detection systems 10, 100 may be used in conjunction with a valve 112 as an alternative to the above-described valve 12. The valve 112 includes a body, which itself comprises a valve bonnet 114. Extending axially through the valve bonnet 114 is a central passageway 116. As seen in FIG. 3, the passageway 116 extending through the valve bonnet 114 is not of uniform inner diameter. Rather, when viewed from the perspective shown in FIG. 3, the passageway 116 is divided into an upper section which is of a first inner diameter, a middle section which is of a second inner diameter less than that of the upper section, and a lower section which is of a third inner diameter less than that of the middle section. As a result, the upper and middle sections of the passageway 116 are separated from each other by an annular shoulder 118, with the middle and lower sections of the passageway 116 being separated from each other by an annular shoulder 119. Advanced through the passageway 116 is elongate valve stem 120 of the valve 112, the reciprocal movement of which opens and closes the valve 112 in a conventional manner.

The valve 112 further comprises a packing or sealing system which resides within the upper and middle sections of the passageway 116. The packing system surrounds and exerts radial pressure on that portion of the valve stem 120 which passes therethrough. When viewed from the perspective shown in FIG. 3, the packing system comprises a lower, primary packing 122 which rests upon the shoulder 119, an upper, secondary packing 124, and a lantern ring 126 which is disposed between and thus separates the primary and secondary packings 122, 124 from each other. As further seen in FIG. 3, the lantern ring 126 is not of a uniform outer diameter. Rather, the lantern ring 126 defines a radially extending flange portion which circumvents the outer surface thereof, and is disposed in spaced relation to each of the opposed ends of the lantern ring 126. In the valve 112, an annular gap 129 is defined between the peripheral outer surface of the flange portion of the lantern ring 126 and the upper section of the passageway 116 which is of the first inner diameter. Disposed within the gap 129 and captured between the peripheral outer surface of flange portion of the lantern ring 126 and the inner surface of that portion of the valve bonnet 114 defining the upper section of the passageway 116 is an annular seal 127 of the packing system, such seal 127 having a generally U-shaped cross-sectional configuration. The seal 127 is oriented within the gap 129 such that an annular channel defined thereby as a result of the U-shaped cross-sectional configuration thereof faces the shoulder 118.

As further seen in FIG. 3, extending to the gap 129 within the upper section of the passageway 116 is one end of an inter-stage port or leak port 128 of the valve 112. The leak port 128 extends in generally perpendicular relation to the axis of the passageway 116 (and hence the valve stem 120), and is operative to place the upper section of the passageway 116 into fluid communication with ambient air. Due to its alignment with the lantern ring 126, the leak port 128 effectively extends between the primary and secondary packings 122, 124. The leak port 128 further extends between the seal 127 and the shoulder 118. The use of the leak port 128 will be discussed in more detail below.

In the valve 112, the packing system (including the primary and secondary packings 122, 124 and lantern ring 126) is preferably "live-loaded." In this regard, compression is preferably applied to the packing system through the use of a pair of elongate packing bolts 130 which are each attached at one end to the valve bonnet 114. The other end of each of the packing bolts 130 is attached to a load flange 132 of the valve 112. The load flange 132 is itself cooperatively engaged to (i.e., bears on) a packing follower or sleeve 134 of the valve 112. When viewed from the perspective shown in FIG. 3, the load flange 132 bears against the upper end portion of the packing sleeve 134, with the opposed, lower end portion of the packing sleeve 134 normally residing within the upper section of the passageway 116 and being abutted against the seal 127. The upper portion of the packing sleeve 134 itself bears against the secondary packing 124. As such, the secondary packing 124 is effectively captured between the packing sleeve 134 and the lantern ring 126, with the primary packing 122 effectively being captured between the lantern ring 126 and the shoulder 119 defined between the middle and lower portions of the passageway 116. The valve stem 120 extends axially through the packing sleeve 134, and further through a central opening of the load flange 132 which is coaxially aligned with the passageway 116.

In the valve 112, the tightening of the packing bolts 130, and in particular the nuts 136 threadably engaged thereto, increases the pressure on the packing system, thus facilitating the application of radial pressure onto the valve stem 120. To facilitate the live-loaded functionality of the valve 112, a series of springs such as Belleville springs 138 are captured between each of the nuts 136 and the corresponding exterior surface of the load flange 132. The springs 138 provide the live-loaded functionality which can automatically compensate for changes that may take place in the packing system under the operating conditions of the valve 112, such as high pressures and temperatures. In this regard, since the volume of the packing materials used for the primary and secondary packings 122, 124 may reduce under certain operating conditions, the spring pressure exerted by the springs 138 compensates for such reduction and maintains the required pressure, this helping to maintain the integrity of the seal to the valve stem 120 facilitated by the packing system. Alternatively, if the volume of the packing material for the primary and secondary packings 122, 124 increases, the resultant increase in the radial pressure exerted by the packing system on the valve stem 120 can be accommodated by the compression of the springs 138.

During operation of the valve 112, any fluid leakage past the primary packing 122 will reach the lantern ring 126 and will be directed into the leak port 128 within the valve bonnet 114. The leaking fluid will flow through the leak port 128 and into either the of the detection systems 10, 100 (via the fluid line 42), each of the detection systems 10, 100 functioning in the manner described above. In this regard, any closure of the leak port 128 facilitated by the actuation (automatically or manually) of the on-off valve 40 from its open position to its closed position facilitates the pressurization of the secondary packing 124, thereby maximizing its efficacy in relation to reducing the level of the leakage from the valve 112, or eliminating such leakage in its entirety. Since, with either of the detection systems 10, 100, the leak port 128 is normally open, any fluid leakage of the primary packing 122 is normally sent to ambient air. However, prior to the fluid leakage being vented to atmosphere, it is measured by the leak detection unit 44 in the aforementioned manner. As explained above, it is only after the leak is measured and compared to a prescribed leak value that the on-off valve 40 is potentially actuated to its closed position, thus facilitating the pressurization of the secondary packing 124. Thus, since the leak port 128 is not normally closed, any fluid leakage from the primary packing 122 will not normally pressurize the secondary packing 124, and thus will not facilitate the premature wear and potential failure thereof. As a result, the detection system 10, 100 is operative to effectively switch the sealing function of the valve 112 from the primary packing 122 to the secondary packing 124 in the case of a failure identified by the leak detection unit 44. Along these lines, the programmable logic unit 48 is operative to either facilitate the automatic switch in operation from the primary packing 122 to the secondary packing 124 or, alternatively, to transmit an alarm which compels the manual switch of such operation.

Those of ordinary skill in the art will recognize that from the perspective shown in FIG. 3, the structural features of the valve 112 to the left side of the valve stem 120 (though not being shown) are essentially a mirror image of those shown to the right of the valve stem 120, the exception being that the valve bonnet 114 includes only the single leak port 128 formed therein and extending therethrough.

Figure 4:
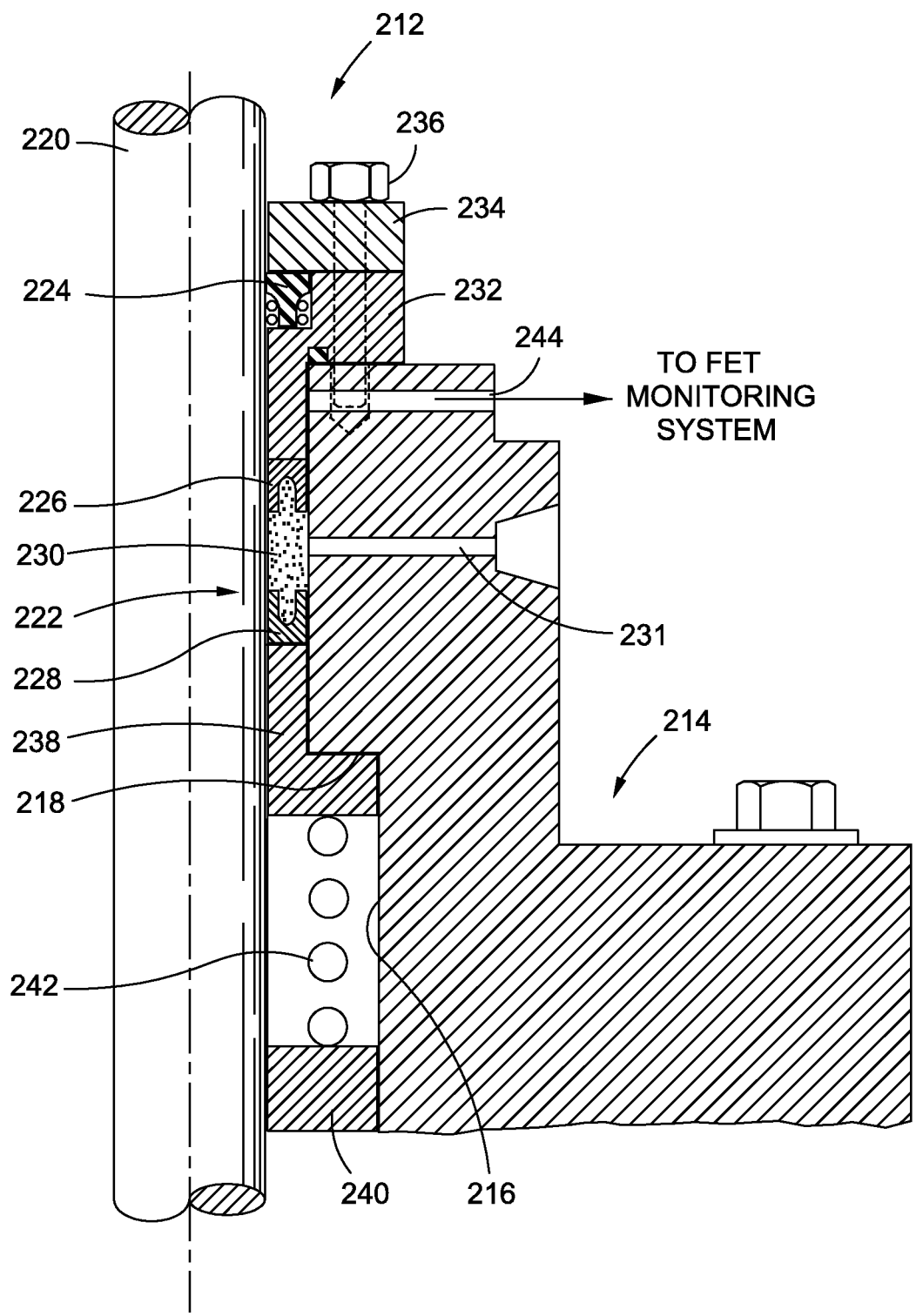
FIG. 4 is a partial cross-sectional view of a valve including a packing system which is suited for use with the valve packing fugitive emission detection systems shown in FIG. 1 or 2 and may be used as a further alternative for the exemplary valve and packing system shown therein.

Referring now to FIG. 4, in accordance with the present invention, it is further contemplated that either of the above-described detection systems 10, 100 may be used in conjunction with a valve 212 as an alternative to the above-described valve 12. More particularly, the valve 212 includes a body, which itself comprises a valve bonnet 214. Extending axially through the valve bonnet 214 is a central passageway 216. As seen in FIG. 4, the passageway 216 extending through the valve bonnet 214 is not of uniform inner diameter. Rather, the passageway 216 is divided into an upper section which is of the first inner diameter, and a lower section which is of a second inner diameter exceeding that of the upper section. As a result, the upper and lower sections of the passageway 216 are separated from each other by an annular shoulder 218. Advanced through the passageway 216 is elongate valve stem 220 of the valve 212, the reciprocal movement of which opens and closes the valve 212 in a conventional manner.

The valve stem 220 of the valve 220 is preferably provided with a hard coated and super-finish stem coating. Additionally, the diameter of the valve stem 220 is less than that of the upper section of the central passageway 216, such that an annular gap is normally defined between the valve stem 220 and that inner surface portion of the valve bonnet 214 defining the upper section of the central passageway 216.

The valve 212 includes a packing system which is integrated therein and resides within both the upper and lower sections of the passageway 216, with portions of the packing system surrounding and exerting radial pressure against the valve stem 220. When viewed from the perspective shown in FIG. 4, the packing system comprises a lower, primary packing 222. The primary packing 222 comprises an annular, upper packing member 226 which circumvents the valve stem 220 and has a generally U-shaped cross-sectional configuration. The upper packing member 226 is preferably fabricated from a material which is adapted to maintain a fluid tight seal against the outer surface of the valve stem 220 even upon the sliding movement of the valve stem 220 relative to the upper packing member 226. In addition to the upper packing member 226, the primary packing 222 includes a lower packing member 228 which is identically configured to, and may be fabricated from the same material as, the upper packing member 226. As such, the lower packing member 228 also circumvents the valve stem 220 and is operative to maintain a fluid tight seal against the outer surface of the valve stem 220 despite any sliding movement of the valve stem 220 relative thereto.

The upper and lower packing members 226, 228 of the primary packing 222 each reside within the upper section of the central passageway 216, and are disposed in spaced relation to each other such that annular channels defined by the upper and lower packing members 226, 228 as a result of the U-shaped cross-sectional configurations thereof face each other. The upper and lower packing members 226, 228 are also effectively compressed between the outer surface of the valve stem 220 and that interior surface of the valve bonnet 214 defining the upper section of the passageway 216 such that the upper and lower packing members 226, 228 are each disposed in slidable, sealed engagement with the valve bonnet 214, in addition to being in slidable, sealed engagement with the valve stem 220.

The primary packing 222 further comprises a fluid or liquid barrier 230 which is captured between the upper and lower packing members 226, 228. More particularly, the barrier 230 is disposed or filled into that portion of the annular gap between the valve stem 220 and valve bonnet 214 which is bounded by the upper and lower packing members 226, 228. The migration of the barrier 230 beyond the upper and lower packing members 226, 228 is prevented by the above-described fluid tight engagement between such upper and lower packing members 226, 228 and each of the valve stem 220 and valve bonnet 214. In an exemplary embodiment of the present invention, the barrier 230 is a viscous liquid such as grease which is formulated to provide certain fluid sealing characteristics within a prescribed range of operating temperatures for a prescribed type of process fluid flowing through the valve 212. In the valve 212, the barrier 230 is introduced into that portion of the gap located between the upper and lower packing members 226, 228 via an injection port 231 which extends through the valve bonnet 214 in generally perpendicular relation to the axis of the passageway 216 (and hence the valve stem 220).

The packing system further comprises a packing follower 232. As viewed from the perspective shown in FIG. 4, the packing follower 16 includes an annular upper section which is of a first outer diameter, and a tubular lower section which protrudes from the upper section and is of a second outer diameter less than that of the first outer diameter of the upper section. As a result, the upper and lower sections of the packing follower 232 are separated by an annular shoulder. The packing follower 232 further defines a central bore which extends axially therethrough. The valve stem 220 is slidably advanced through the central bore of the packing follower 232. The lower section of the packing follower 232 is dimensioned so that the same is capable of being slidably advanced into the upper section of the passageway 216 into the annular gap defined between the valve stem 220 and the valve bonnet 214. It is contemplated that the lower section of the packing follower 232 will normally be advanced into the upper section of the passageway 216 to a depth whereat the shoulder defined between the upper and lower sections of the packing follower 232 will be abutted against the top, distal end of the valve bonnet 214 as viewed from the perspective shown in FIG. 4.

In the packing system, disposed within a complimentary recess or channel formed in the annular upper section of the packing follower 232 is an annular secondary packing 224. As viewed from the perspective shown in FIG. 4, the aforementioned recess extends to the top surface of the annular upper section of the packing follower 232, and is further formed such that the inner peripheral surface of the secondary packing 224 residing therein is substantially flush or continuous with that surface of the packing follower 232 which defines the central bore thereof. The secondary packing 224 is effectively captured and maintained within the recess by an annular retention member 234 which is attached to the top surface of the annular upper section of the packing follower 232, and also defines a central bore which slidably accommodates the valve stem 220. In the valve 212, fasteners such as bolts 236 are used to facilitate the rigid attachment of the packing follower 232 and retention member 234 to each other, and to the valve bonnet 214 in the manner shown in FIG. 4. The secondary packing 224 is configured to exert radially inwardly directed pressure against the valve stem 220 as effectively maintain a fluid tight seal against the outer surface of the valve stem 220 even upon the sliding movement of the valve stem 220 relative to the secondary packing 224.

The packing system further comprises tubular loading piston 238 which directly abuts the primary packing 222, and in particular the lower packing member 228 thereof. As viewed from the perspective shown in FIG. 4, the loading piston 238 includes a tubular upper section which is of a first outer diameter, and an annular lower section which is of a second outer diameter exceeding that of the first outer diameter of the upper section. As a result, the upper and lower sections of the loading piston 238 are separated by an annular shoulder. The loading piston 238 further defines a central bore which extends axially therethrough, and slidably accommodates the valve stem 220. The upper section of the loading piston 238 is dimensioned so that the same is capable of being slidably advanced into the upper section of the passageway 216 into the annular gap defined between the valve stem 220 and the valve bonnet 214. However, the size and configuration of the lower section of the loading piston 238 makes it incapable of being advanced into the upper section of the passageway 216, the lower section of the loading piston 238 thus being confined to the lower section of the passageway 206.

The packing system further comprises an annular spring retainer 240 which circumvents the valve stem 220 and is constrained to a prescribed location within the lower section of the passageway 216. Positioned and extending between the lower section of the loading piston 238 and the spring retainer 240 is at least one internal spring 242. When viewed from the perspective shown in FIG. 4, the spring 242 is operative to normally bias the loading piston 238 upwardly toward the top, distal end of the valve bonnet 214. In the packing system, the loading piston 238, spring 242 and spring retainer 240 collectively define a live-loading sub-assembly of the packing system which is operative to maintain a prescribed level of compressive pressure on the primary packing 222.

During the operation of the valve 212 including the above-described packing system, the combination of the upper and lower packing members 226, 228 and the barrier 230 therebetween within the primary packing 222 provides an effective, fluid-tight seal which prevents fluid migrating upwardly through the lower section of the passageway 216 from further migrating through the upper section of the passageway 216 and escaping the valve 212 via the top, distal end of the valve bonnet 214. Despite the reciprocal upward and downward movement of the valve stem 220 during the operation of the valve 212, the primary packing 222 is essentially maintained in the orientation shown in FIG. 4, though the upper and lower packing members 226, 228 are capable of some measure of slidable movement along that interior surface of the valve bonnet 214 defining the upper section of the passageway 216. Providing the valve stem 220 with the hard coated and super-finish stem coating reduces friction and thus premature wear of the upper and lower packing members 226, 228 despite repeated cycles of the slidable movement of the valve stem 220 relative thereto.

In addition, despite increases or decreases in the volume of the barrier 230 and/or changes in the dimensional characteristics of the upper and lower packing members 226, 228 resulting from changes in the operating condition of the valve 212 (e.g., pressures and/or temperature changes), the fluid pressure of the barrier 230 is maintained above the process pressure of the fluid flowing through the valve 212 as a result of the live-loading thereof attributable to the above-described live-loading sub-assembly comprising the loading piston 238, spring 242 and spring retainer 240. As will be recognized, the upward range of movement of the loading piston 238 is limited by the abutment of the shoulder defined between the upper and lower sections of the loading piston 238 against the shoulder 218 defined between the upper and lower sections of the central passageway 216.

During operation of the valve 212, any fluid leakage past the primary packing 222 will be directed into a leak port 244 within the valve bonnet 214. The leak port 244 extends in generally perpendicular relation to the axis of the passageway 216 (and hence the valve stem 220), and is operative to place the upper section of the passageway 216 into fluid communication with ambient air. As seen in FIG. 4, the leak port 244 effectively extends between the primary and secondary packings 222, 224. The leaking fluid will flow through the leak port 244 and into either the of the detection systems 10, 100 (via the fluid line 42), each of the detection systems 10, 100 functioning in the manner described above. In this regard, any closure of the leak port 244 facilitated by the actuation (automatically or manually) of the on-off valve 40 from its open position to its closed position facilitates the pressurization of the secondary packing 224, thereby maximizing its efficacy in relation to reducing the level of the leakage from the valve 212, or eliminating such leakage in its entirety. Since, with either of the detection systems 10, 100, the leak port 244 is normally open, any fluid leakage of the primary packing 222 is normally sent to ambient air. However, prior to the fluid leakage being vented to atmosphere, it is measured by the leak detection unit 44 in the aforementioned manner. As explained above, it is only after the leak is measured and compared to a prescribed leak value that the on-off valve 40 is potentially actuated to its closed position, thus facilitating the pressurization of the secondary packing 224. Thus, since the leak port 244 is not normally closed, any fluid leakage from the primary packing 222 will not normally pressurize the secondary packing 224, and thus will not facilitate the premature wear and potential failure thereof. As a result, the detection system 10, 100 is operative to effectively switch the sealing function of the valve 212 from the primary packing 222 to the secondary packing 224 in the case of a failure identified by the leak detection unit 44. Along these lines, the programmable logic unit 48 is operative to either facilitate the automatic switch in operation from the primary packing 222 to the secondary packing 224 or, alternatively, to transmit an alarm which compels the manual switch of such operation.

Those of ordinary skill in the art will recognize that from the perspective shown in FIG. 4, the structural features of the valve 212 to the left side of the valve stem 220 (though not being shown) are essentially a mirror image of those shown to the right of the valve stem 220, the exception being that the valve bonnet 214 includes only the single leak port 128 and a single injection port 231 formed therein and extending therethrough.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure. For example, it is contemplated that the detection system 10 and the detection system 100 may each be used in conjunction with valves which include primary and secondary packings, but otherwise have structural and functional features differing from those described above in relation to the valves 12, 112, 212.

What is claimed is:
1. A fugitive emission detection system, comprising:
a valve comprising a housing which defines a passageway having a valve stem extending at least partially therethrough, the passageway having a first section that is of a first diameter and a second section that is of a smaller second diameter, the housing having a leak port formed therein which fluidly communicates with the passageway, and extends from the passageway to an outer surface of the housing;
a conduit fluidly coupled to the leak port and being separate from the housing;
an on-off valve fluidly connected to the leak port via the conduit, the on-off valve being in a normally open position and selectively movable to a closed position, the leak port and on-off valve being configured to allow fluid to be exhausted from the passageway and exit the housing through the leak port when the on-off valve is in the open position;
a primary packing located upstream of the leak port in the first section of the passageway such that fluid entering the leak port flows past the primary packing;
a secondary packing located downstream of the leak port in the first section of the passageway such that the secondary packing is actuated in response to movement of the on-off valve to the closed position, the primary packing and the secondary packing being configured and arranged to enable application of a compressive load thereto applied from a common source;
a leak detection unit fluidly connected to the on-off valve;
a programmable logic unit electrically connected to the on-off valve and the leak detection unit and being operative to carry out a leak test according to preset parameters; and
a positioner electrically connected to the logic unit and mechanically coupled to the valve stem;
the logic unit being operative to receive information from the positioner and recurrently initiate the leak test based on the information received from the positioner;
the logic unit further being operative to selectively actuate the on-off valve from the open position to the closed position in response to a signal generated by the leak detection unit indicative of a leak within the valve attributable to flow of a fluid from the passageway into the leak detection unit via the leak port.

2. The detection system of claim 1 wherein the positioner is adapted to monitor at least one of:
a number of cycles of the valve stem;
a total stroke of the valve stem; and
a time of operation of the valve.

3. The detection system of claim 1 further comprising:
a lantern ring interposed between the primary and secondary packings and configured to enable fluid to pass therethrough as such fluid flows from the passageway in the housing to the leak port;
the leak port fluidly communicating with the passageway at a location between the primary and secondary packings.

4. The detection system of claim 1 further comprising:
a packing follower at least partially positioned between the primary and secondary packings;
the leak port fluidly communicating with the passageway at a location between the primary and secondary packings.

5. The detection system of claim 4 wherein the primary packing comprises:
an upper packing member;
a lower packing member; and
a fluid barrier interposed between the upper and lower packing members.

6. The detection system of claim 5 wherein the housing of the valve further includes an injection port which is formed therein and fluidly communicates with the passageway at a location between the upper and lower packing members for facilitating the introduction of the fluid barrier therebetween.

7. A fugitive emission detection system, comprising:
a valve comprising a housing having a leak port formed therein;
a conduit separate from the housing, fluidly coupled to the leak port and extending from the housing;
an on-off valve fluidly connected to the leak port via the conduit, the on-off being in a normally open position and selectively movable to a closed position, the leak port and on-off valve being configured to allow fluid to be exhausted from and exit the housing through the leak port when the on-off valve is in the open position;
a primary packing located upstream of the leak port such that fluid entering the leak port flows past the primary packing;
a secondary packing located downstream of the leak port such that the secondary packing is actuated in response to movement of the on-off valve to the closed position, the primary packing and the secondary packing being configured and arranged to enable application of a compressive load thereto applied from a common source;
a leak detection unit fluidly connected to the on-off valve;
a programmable logic unit electrically connected to the on-off valve and the leak detection unit and being operative to carry out a leak test according to preset parameters; and
a positioner electrically connected to the logic unit and mechanically coupled to the valve;
the logic unit being operative to receive information from the positioner and recurrently initiate the leak test based on the information received from the positioner;
the logic unit further being operative to selectively actuate the on-off valve from the open position to the closed position in response to a signal generated by the leak detection unit indicative of a leak within the valve attributable to flow of a fluid into the leak detection unit via the leak port.

8. The detection system of claim 7 wherein the positioner is adapted to monitor at least one of:
a number of cycles of a valve stem of the valve;
a total stroke of the valve stem; and
a time of operation of the valve.

9. The detection system of claim 7 further comprising:
a lantern ring interposed between the primary and secondary packings;
the leak port fluidly communicating with the passageway at a location between the primary and secondary packings.

10. The detection system of claim 7 further comprising:
a packing follower at least partially positioned between the primary and secondary packings;
the leak port fluidly communicating with the passageway at a location between the primary and secondary packings.

11. The detection system of claim 10 wherein the primary packing comprises:
an upper packing member;
a lower packing member; and
a fluid barrier interposed between the upper and lower packing members.

12. The detection system of claim 11 wherein the housing of the valve further includes an injection port which is formed therein and configured to facilitate the introduction of the fluid barrier between the upper and lower packing members.

13. A fugitive emission detection system, comprising:
a valve comprising a housing which defines a non-uniform diameter passageway having a valve stem extending at least partially therethrough, a packing system which is at least partially disposed within the passageway between the valve stem and the housing, and a leak port which is formed in the housing and fluidly communicates with the passageway;
a conduit fluidly separate from the housing, coupled to the leak port and extending from the housing;
a control valve fluidly connected to the leak port via the conduit and transitional between a first position and a second position, the control valve and leak port being configured to allow fluid to be exhausted from and exit the housing through the leak port when the control valve is in the first position, the control valve being normally in the first position;
a primary packing located upstream of the leak port such that fluid entering the leak port flows past the primary packing;
a secondary packing located downstream of the leak port such that the secondary packing is actuated in response to movement of the control valve to the closed position, the primary packing and the secondary packing being configured and arranged to enable application of a compressive load thereto applied from a common source;
a leak detection unit fluidly connected to the control valve;
a programmable logic unit electrically connected to the control valve and the leak detection unit and being operative to carry out a leak test according to preset parameters; and
a positioner electrically connected to the logic unit and mechanically coupled to the valve stem; and
the logic unit being operative to receive information from the positioner and recurrently initiate the leak test based on the information received from the positioner;
the logic unit further being operative to selectively actuate the control valve from a first position to a second position in response to a signal generated by the leak detection unit indicative of a leak within the valve attributable to flow of a fluid from the passageway into the leak detection unit via the leak port, the movement of the control valve from the first position to the second position being adapted to facilitate the pressurization of at least a portion of the packing system.

14. The detection system of claim 13 wherein the positioner is adapted to monitor at least one of:
a number of cycles of the valve stem;
a total stroke of the valve stem; and
a time of operation of the valve.

15. The detection system of claim 13 further comprising:
a lantern ring interposed between the primary and secondary packings;
the leak port fluidly communicating with the passageway at a location between the primary and secondary packings.

16. The detection system of claim 13 further comprising:
a packing follower at least partially positioned between the primary and secondary packings;
the leak port fluidly communicating with the passageway at a location between the primary and secondary packings.

17. The detection system of claim 16 wherein the primary packing comprises:
an upper packing member;
a lower packing member; and
a fluid barrier interposed between the upper and lower packing members.

* * * * *